Figure 1:
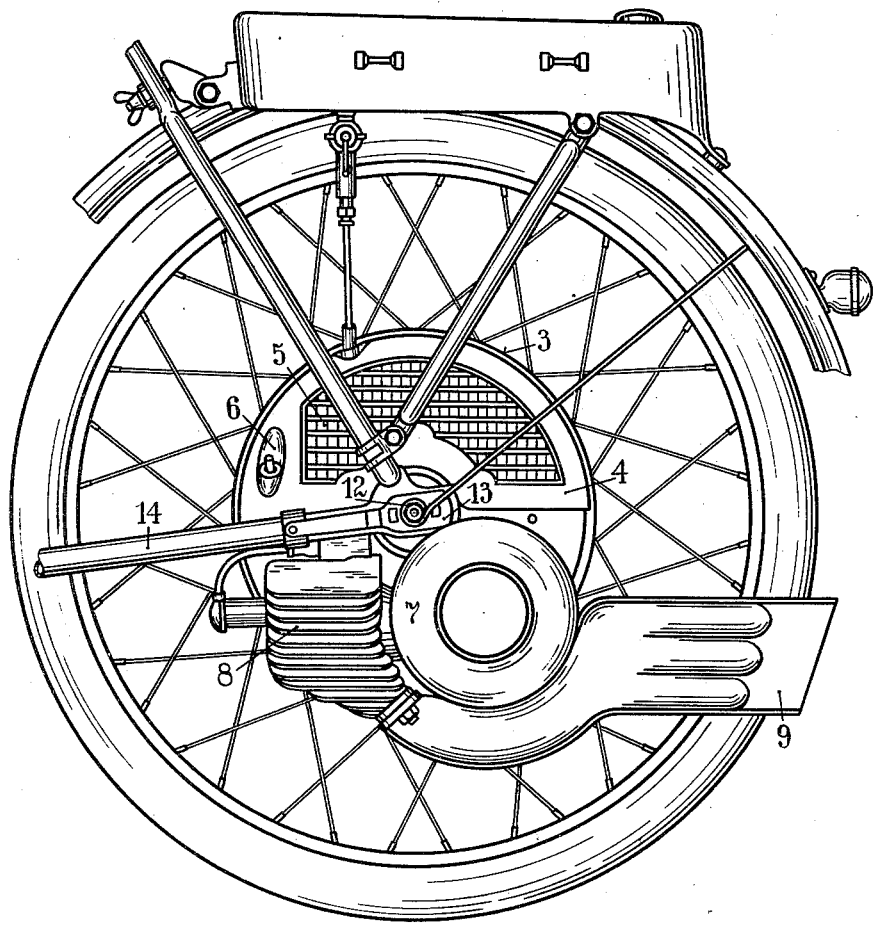

Nov. 14, 1939.   L. BRUCKMOSER   2,179,478
MOTOR BICYCLE
Filed Feb. 17, 1938   3 Sheets-Sheet 1

Inventor
Ludwig Bruckmoser
by
Dean Fairbank & Hirsch

Nov. 14, 1939.   L. BRUCKMOSER   2,179,478
MOTOR BICYCLE
Filed Feb. 17, 1938   3 Sheets-Sheet 2

Inventor
Ludwig Bruckmoser

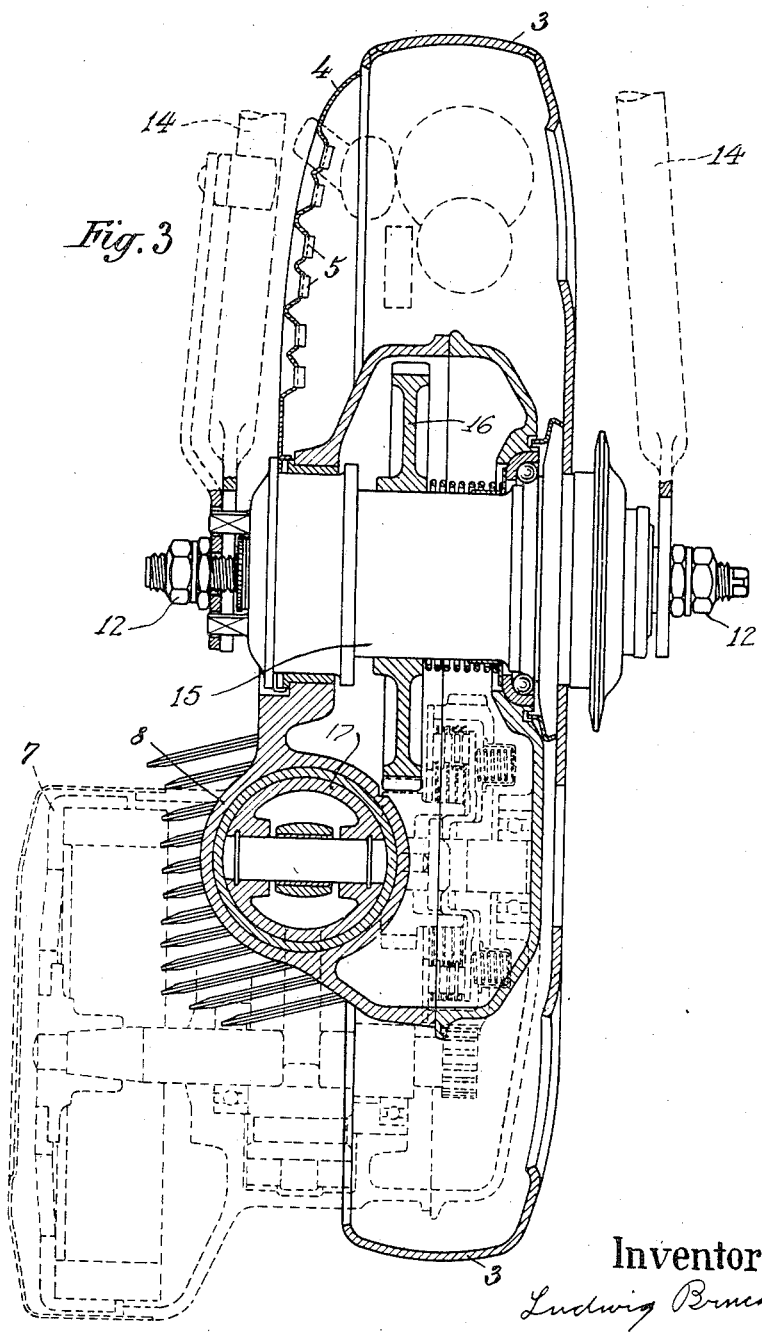

Patented Nov. 14, 1939

2,179,478

UNITED STATES PATENT OFFICE 2,179,478

MOTOR BICYCLE

Ludwig Bruckmoser, Schweinfurt, Germany

Application February 17, 1938, Serial No. 191,005
In Germany February 19, 1937

2 Claims. (Cl. 180—33)

This invention relates to motor driven bicycles and more particularly to the mounting of the motor upon the rear driving wheel of the vehicle.

Many of the details of construction of an embodiment of the present invention are disclosed in Patent No. 2,138,619, issued November 29, 1938, to Gustav Steinlein and myself.

The object of the invention is to so construct and dispose the motor that all operating parts are well protected in an enclosing small casing, the engine cylinder being substantially located on one side of the wheel below the vehicle frame, and the parts liable to be accidentally injured are enclosed in that part of the casing which is placed within the perimeter of the wheel and connected with the spokes of the wheel.

This object is attained by forming the protective casing out of three parts, namely, a cap-shaped drum, a detachable cover, and a motor case. The cap-shaped drum is connected with the wheel hub and with the spokes. The cover closes the open side of the upper half of the drum and is detachably fixed to the motor case, which latter encloses the engine cylinder, the crank, the transmission gearing and clutch members. These lie substantially within and partly at the side of the drum which is suspended as a pendulum on the wheel hub. It may oscillate to a slight extent about the axis of the wheel hub but such oscillation is resisted by springs abutting against a stationary part of the back-pedaling brake which is within the free-wheel hub and fixed in respect to the drum by the usual brake arm. Thus, the reactions of the motor are resiliently transmitted to the drum substantially as shown and described in the copending application of Steinlein and Bruckmoser, Serial No. 189,420 filed February 8, 1938. The motor case and cover may be considered as stationary parts of the casing because the oscillation movements of these two parts are very small.

In the upper half of the casing which is formed by the drum and cover, there are arranged the accessories of the motor such as the carburetor and the controlling elements, for instance, the members for controlling the gearing and the clutch.

The stationary motor case with its enlarged lower part of greater width enclosing the crank, the gearing, and the clutch members, is located within the lower half of the rotatable drum beneath the horizontal rear frame-fork. A part of the drum carries the cooling ribs of the engine cylinder and only these cooling ribs, the exhaust pipe, and the flywheel are arranged wholly outside of the drum. The cylinder, the magneto, and the exhaust pipe, therefore, are subjected to an ample cooling. The center of gravity of the wheel is placed rather low owing to this arrangement.

The upper half of the casing can be made narrow enough to fit between the rear fork tubes of the frame and by its elevated position be better protected against dust, so that the enclosed gear elements can sufficiently be ventilated.

In the accompanying drawings, which form a part of this specification, an embodiment of the invention is represented by way of example.

Figure 2:
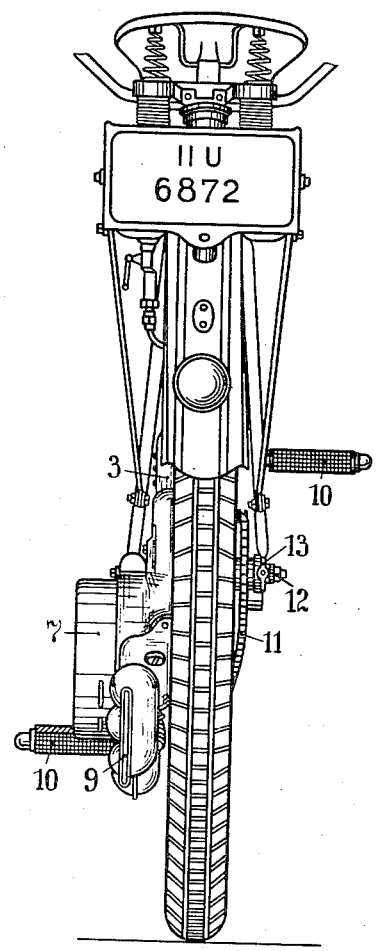

Fig. 1 shows a side elevation of the rear part of a motor cycle and the driving wheel mounted therein, Fig. 2 illustrates the end view of the motor cycle, and Fig. 3 is a transverse vertical section through the center portion of the driving wheel.

In the figures like numerals designate like or corresponding parts.

The central portion of the driving wheel is constituted by a protective cap-shaped drum 3 carrying the spokes. With its central recess this drum is fastened to the hub 15 of the wheel so as to form a part thereof. The said wheel hub encloses a free-wheel and back-pedaling mechanism of well known construction so that the bicycle may optionally be driven by means of the pedals 10 and the driving chain 11. The wheel hub is in a conventional manner by its threaded ends and nuts 12 fixed in the fork ends 13.

The drum 3 forms a part of a casing which contains, primarily in its upper half, various accessories of the engine such as a carburetor and auxiliary transmission means for the controlling members of the gearing and the clutch. On its open side substantially all of the upper half of the drum is closed by a detachable cover 4 made of sheet metal and connected with the relatively stationary motor case which includes, for instance, the engine cylinder with its cooling ribs. The cover as well as the drum is provided with ventilating openings 5 and further provided with a special recess 6 by means of which a part of the carburetor is rendered accessible. The upper half of the casing of the engine unit made up of the upper half of the rotatable drum 3 and the cover 4 is so narrow that it is readily placed between the branches of the rear fork 14.

The motor comprises a substantially horizontal piston cylinder 8 below the hub 15, and a piston 17 reciprocable therein, and drives said hub by a transmission which includes a gear 16 affixed to said hub.

In the relatively stationary motor case suspended on the wheel hub and disposed below the wheel axle and the lower frame fork there is provided the engine together with other parts (crank case, clutch members, and gearing) requiring a larger width than said drum, and this is done in such a way that some parts of this unit are partly housed within the said drum and partly at the side of the drum while the major part of the composing elements requiring ample cooling, namely the main part of the cylinder 8 with its cooling ribs, the crank case side with the flywheel 7, magneto and the exhaust pipe 9 are disposed outside of the drum 3 beneath the lower frame fork 14 in a substantially horizontal arrangement so that the engine unit is approximately parallel to this fork.

I claim:

1. In a driving wheel of a motor bicycle having a wheel rim, spokes, and a wheel hub, the combination of a casing comprising a cup-shaped drum rigidly attached to the hub and attached by the spokes to the rim, and a substantially stationary motor casing, suspended from the wheel hub, and projecting laterally out of the lower half of said drum beneath the wheel axle, and a cover at the open side of the upper half of the drum and detachably connected with said motor casing, the upper half of the entire casing being disposed between the fork branches of the bicycle frame.

2. In a rear driving wheel of a motor bicycle, the combination with the wheel hub of a three part casing including a drum, a cover, and a combined gear and motor case, said drum being substantially cup-shaped and connected to said hub and the spokes of the wheel for rotation with the wheel, said motor case enclosing the engine cylinder, the crank, the gearing and clutch members and being suspended from the wheel hub and disposed partly within the lower half of said drum, and said cover being detachably connected to said motor case and closing the open side of the upper half of said drum, the upper half of said casing being disposed between the rear fork branches of the bicycle frame and enclosing the carburetor and controlling members for the gearing and the clutch, and said motor case being disposed partly within said drum and having its lower part disposed beneath the horizontal rear frame fork and projecting laterally out of said drum, and being provided with the cooling ribs for the engine, the fly wheel and exhaust pipe of the engine being disposed outside of said casing and below said hub.

LUDWIG BRUCKMOSER.